US005307246A

United States Patent [19]

Schmid et al.

[11] Patent Number: 5,307,246

[45] Date of Patent: Apr. 26, 1994

[54] VEHICLE LAMP

[75] Inventors: Heinrich Schmid, Nürtingen; Margret Schmock-von-Ohr, Reutlingen, both of Fed. Rep. of Germany

[73] Assignee: Robert Bosch GmbH, Stuttgart, Fed. Rep. of Germany

[21] Appl. No.: 793,336

[22] PCT Filed: May 23, 1991

[86] PCT No.: PCT/DE91/00427

§ 371 Date: Jan. 9, 1992

§ 102(e) Date: Jan. 9, 1992

[87] PCT Pub. No.: WO92/00487

PCT Pub. Date: Jan. 9, 1992

[30] Foreign Application Priority Data

Jun. 23, 1990 [DE] Fed. Rep. of Germany ....... 4020081

[51] Int. Cl.[5] .............................................. B60Q 1/04

[52] U.S. Cl. ...................................... 362/61; 362/338

[58] Field of Search ................... 362/61, 80, 328, 329, 362/338, 335

[56] References Cited

U.S. PATENT DOCUMENTS 4,545,007 1/1985 Nagel ............................ 362/338 X

FOREIGN PATENT DOCUMENTS 3707738 9/1988 Fed. Rep. of Germany .

9002245 5/1990 Fed. Rep. of Germany .

2290631 6/1976 France .

*Primary Examiner*—Stephen F. Husar

*Attorney, Agent, or Firm*—Michael J. Striker

[57] ABSTRACT

The vehicle lamp includes a reflector; a light source; and a lens plate having an inner surface facing the reflector and provided with optical elements for deflecting light beams reflected from the reflector. Each of the optical elements is constructed so that the light beams passing therethrough are deflected in each case in a horizontal direction and/or a vertical direction so as to produce a prescribed light distribution identical for all optical elements. Each of the optical elements is subdivided into a number of subprisms having flat surfaces extending tangentially to an envelope of an inner surface of theoptical element. Each of the subprisms is assigned to a region of the light distribution and has a surface determined by an amount of light assigned to the region of the light distribution.

7 Claims, 4 Drawing Sheets

VEHICLE LAMP

BACKGROUND OF THE INVENTION

The present invention relates to a vehicle lamp. More particularly it relates to a vehicle lamp which has a reflector, a light source, a lens plate, an optical element for deflecting light beams reflected from the reflector.

Such a vehicle lamp is known from German Offenlegungsschrift 3,336,178. This vehicle lamp has a reflector in which a light source is inserted and whose light exit opening is covered by a lens plate. On its inner surface pointing towards the reflector, the lens plate has optically active elements in the form of cylindrical lenses. The light beams reflected from the reflector are deflected by the cylindrical lenses in order to produce a light distribution closely approaching a prescribed light distribution. Because of the cross-sectional shape of the cylindrical lenses in the form of a curve of conical section, and of the scattering effect characteristic of the respective curve of conical section, the prescribed light distribution cannot be achieved. The production of a desired symmetrical light distribution is impossible, in particular, in lamps with an inclined and/or swivelled lens plate, the light maximum of the light distribution produced by such lamps rather being laterally displaced.

SUMMARY OF THE INVENTION

Accordingly, it is an object of the present invention to provide a vehicle lamp which avoids the disadvantages of the prior art.

In keeping with these objects and with others which will become apparent hereinafter, one feature of the present invention resides, briefly stated, in a vehicle lamp in which each optical element is formed so that the light beams passing through an element are deflected in each case in the horizontal and/or vertical directions such that beams produce the shape of a prescribed light distribution identical for all elements. has, by contrast, the advantage that owing to the configuration of the optically active elements a prescribed light distribution is exactly produced by the vehicle lamp.

In accordance with a further feature of the present invention each optical element is subdivided into a plurality of subprisms having flat surfaces extending tangentially to an envelope of the inner surface of the element. Each subprism is assigned to produce a region of the light distribution. The surface of the subprism is determined by the amount of light assigned to that region of the light distribution.

In accordance with another feature of the present invention the envelope of each of the optical elements has a convex shape, so that with reference to a horizontal direction a left-hand edge region of the light exit direction of the optical element deflects the light beams into a right-hand edge regionof the light distribution, a central region of the optical element deflects the light beams into a central region of the light distribution, and a right-hand edge region of the optical element deflects the light beams into a left-hand edge region of the light distribution, in a vertical direction an upper edge region of the optical element deflects the light beams into a lower edge region of the light distribution, the central region of the optical element deflects the light beams into the central region of the light distribution, and a lower edge region of an element deflects the light beams into the upper edge region of the light distribution.

In accordance with still another feature of the present invention each element is formed as a concave lens, so that in each case with reference to the horizontal direction the left-hand edge region in the light exit direction of an element deflects the light beams into the left-hand edge region of the light distribution, the central region of the element deflects the light beams into the central region of the light distribution, and the right-hand edge region of an element deflects the light beams into the right-hand edge region of the light distribution. Correspondingly, in the vertical direction the upper edge region of the element deflects the light beams into the upper edge region of the light distribution. The central region of the element deflects the light beams into the central region of the light distribution and the lower edge regionof the element deflects the light beams into the lower edge region of the light distribution.

A further feature of the present invention is that the lens plate is inclined with respect to the vertical axis and/or swivelled with respect to the horizontal axis.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings. FIG. 1 shows a vehicle lamp in the horizontal section; FIG. 2 shows a detail of the lens plate of the vehicle lamp of FIG. 1; FIG. 3 shows a vertical section through the lens plate of the vehicle lamp; FIG. 4 shows a horizontal section through the lens; FIG. 5 shows a prescribed light distribution in a grid; FIG. 6 shows the variation, approximated by a bell-shaped curve, in the light distribution in a horizontal section through the light distribution; FIG. 7 shows the variation, approximated by a bell-shaped curve, in the light distribution in a vertical section through the light distribution; FIG. 8 shows the lens plate in a horizontal section in a coordinate system; FIG. 9 shows the lens plate in a vertical section in a coordinate system; and FIG. 10 shows a variant of the lens plate of FIG. 2.

DESCRIPTION OF PREFERRED EMBODIMENTS

Figure 1:
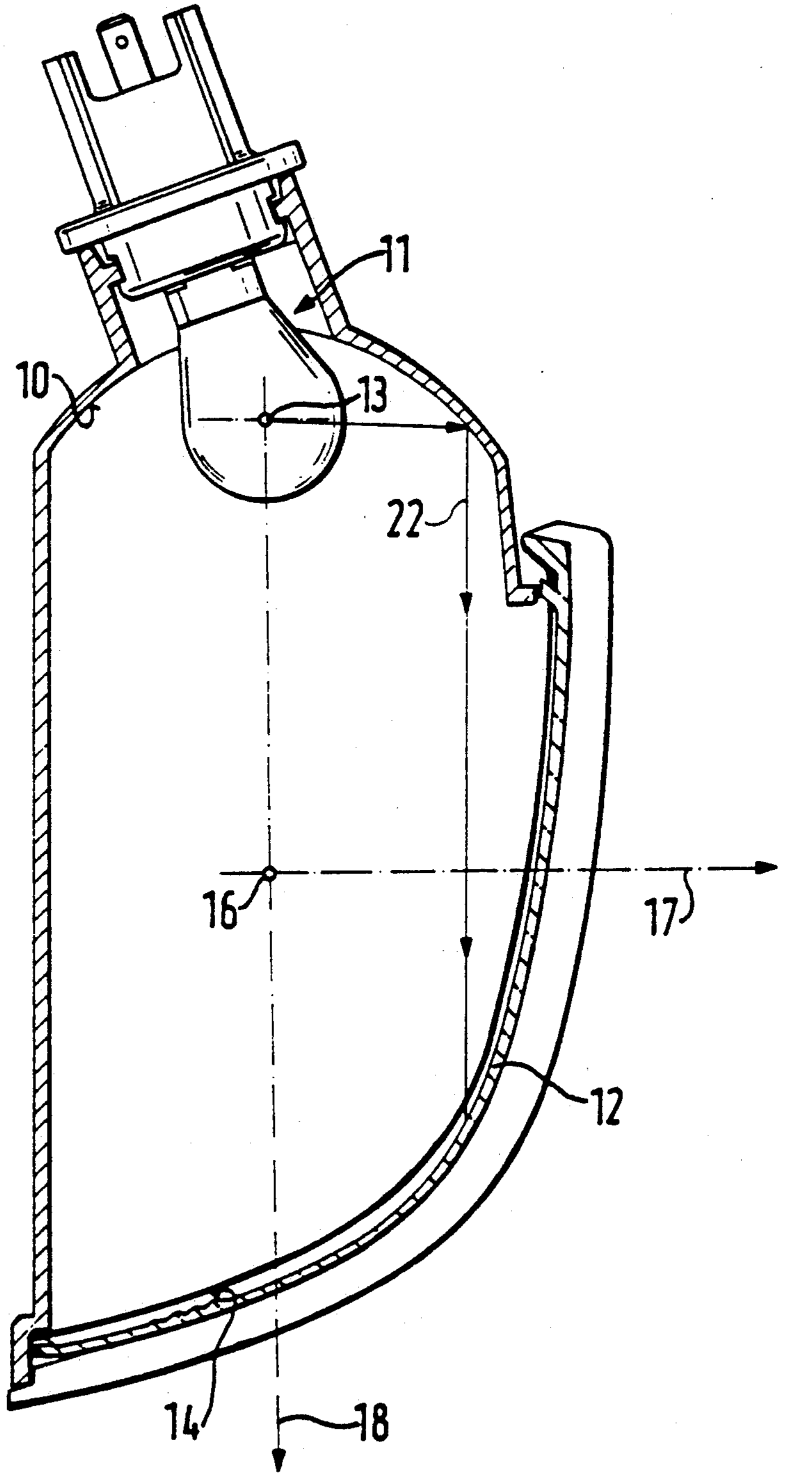
Figure 2:
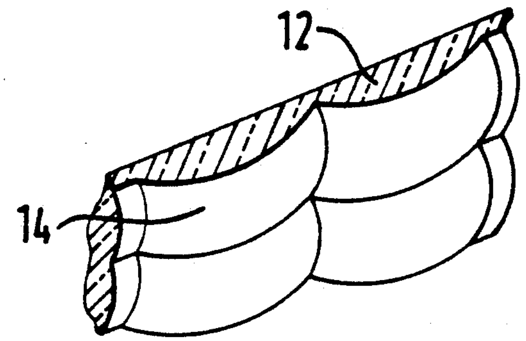
Figure 3:
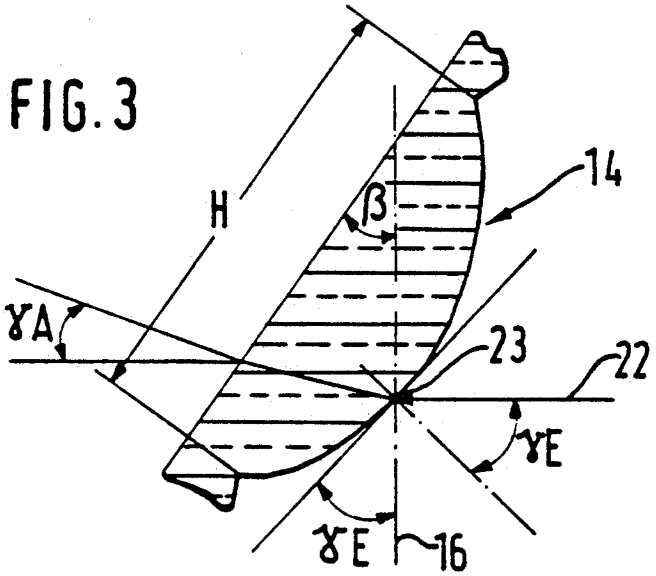
Figure 4:
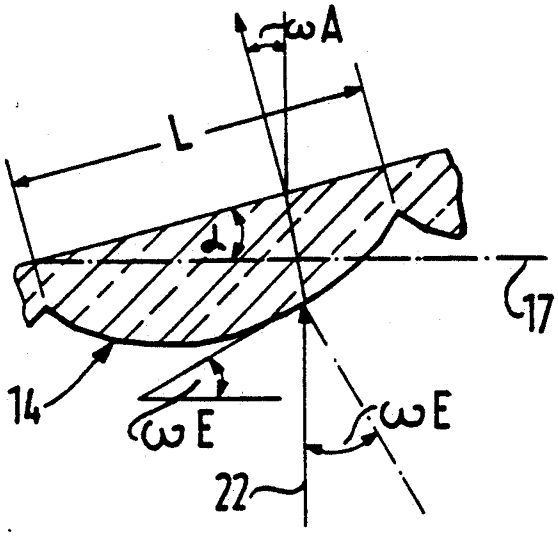
Figure 5:
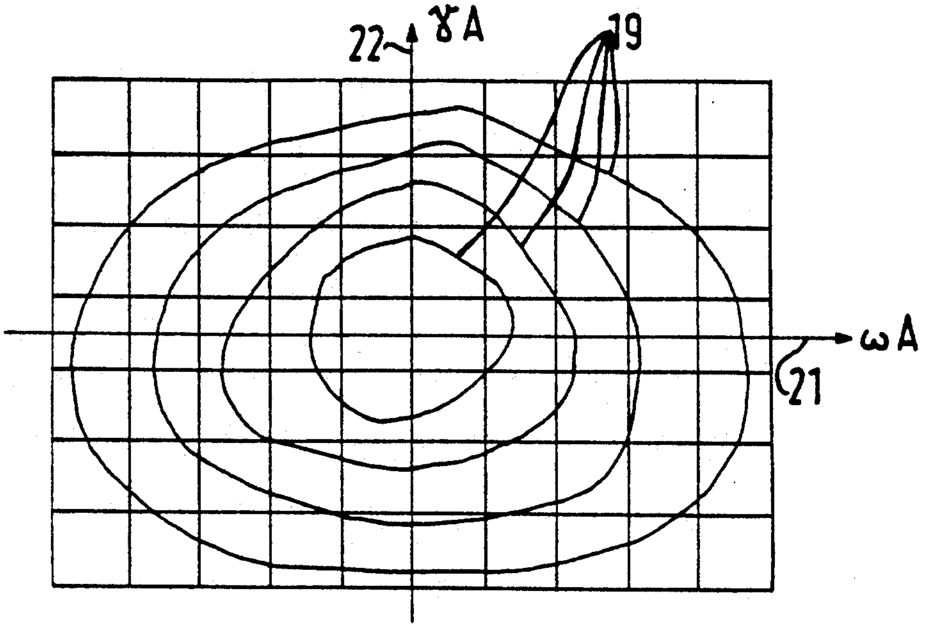
Figure 6:
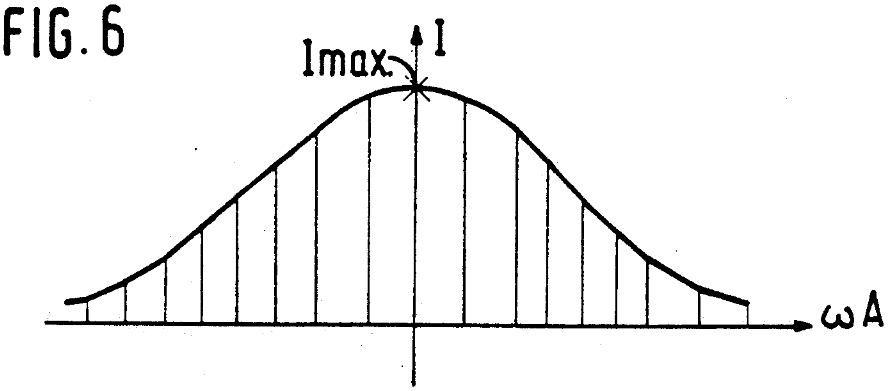
Figure 7:
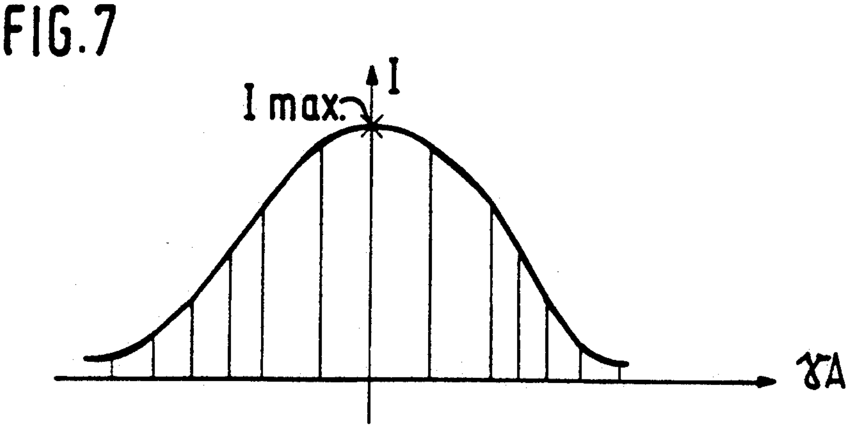
Figure 8:
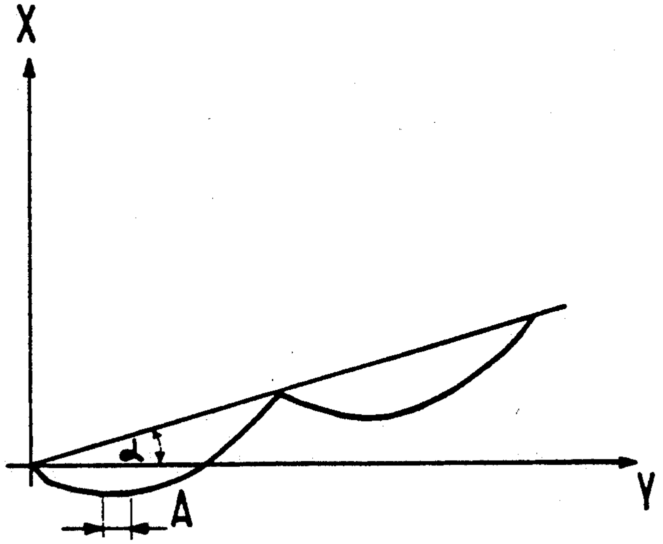
Figure 9:
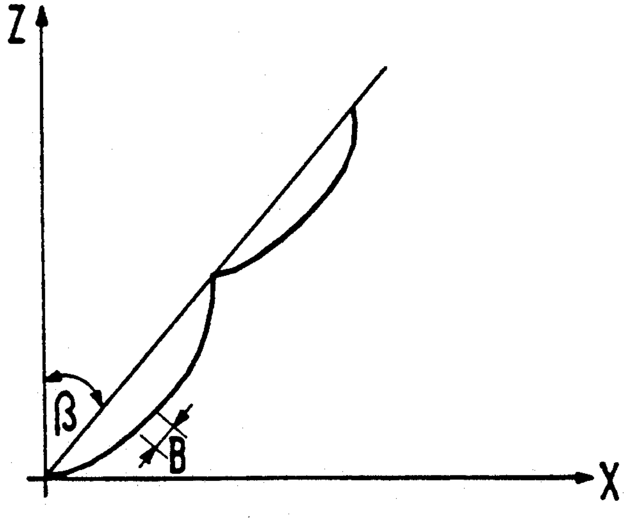

A vehicle lamp represented in FIG. 1 has a reflector 10 in which a light source 11 is inserted. The light exit opening of the lamp is covered by a lens plate 12. The reflector 10 has a reflecting surface formed by a paraboloid of revolution, and the luminous element 13 of the light source 11 is arranged in the focal point of the reflector. Arranged on the lens plate 12 on the inner surface pointing towards the reflector is a multiplicity of optically active elements 14 by which the light beams reflected from the reflector are deflected. Each of the elements 14 is constructed in the horizontal and vertical section such that each element 14 produces a light distribution whose variation corresponds to a prescribed light distribution. The superimposition of the light distributions of the individual elements gives rise to the finished light distribution in the prescribed variation and with the prescribed light intensities. Each element 14 forms a convex lens projecting from the inside of the lens plate and having a curvature directed towards the reflector.

The light beams are deflected by the left-hand edge, seen in the light exit direction, of each element 14 into the right-hand edge region of the prescribed light distribution, the light beams passing through the central region of each element are deflected into the central region of the light distribution, and the light beams passing through the right-hand edge of each element are deflected into the left-hand edge region of the light distribution. In a corresponding fashion, the light beams passing through the upper edge of each element are deflected into the lower region of the light distribution, the light beams passing through the central region of each element are deflected into the central region of the light distribution, and the light beams passing through the lower edge of each element are deflected into the upper edge region of the light distribution.

Each element 14 is subdivided into a multiplicity of subprisms having a flat surface extending tangentially to an envelope of the inner surface of the element. The envelope has a convex shape overall in the exemplary embodiment.

The curves of intersection, which consist of juxtaposed, short straight-line sections, thus arise in horizontal and vertical sections through the element.

The calculation of the elements 14 is described below for a lens plate 12 that is inclined with respect to the vertical axis 16 of a motor vehicle and swivelled with respect to a transverse axis 17 of the motor vehicle. The vertical axis 16, the transverse axis 17 arranged perpendicular to the vertical axis, and a longitudinal axis 18, perpendicular to the vertical axis and transverse axis, of the motor vehicle define a coordinate system which is also referred to as a grid. The first step is to prescribe a desired light distribution in a known way in the form of lines of equal light intensity, so-called isolux lines 19, which extend on a plotting screen arranged perpendicular to the optical axis of the lamp, which extends parallel to the longitudinal axis 18 of the vehicle. The variation of the isolux lines is recorded on the plotting screen in a coordinate system comprising a horizontal axis 21 on which the horizontal angle ωA relative to the optical axis of the lamp is plotted, and a vertical axis 22 on which the vertical angle γA relative to the optical axis is plotted.

The angle of inclination β and swivel angle α, which is also designated as a sweepback angle, of the lens plate 12, more precisely the outer surface of the lens plate, is likewise prescribed, for example, by the installation conditions determined by the motor vehicle manufacturer, it being possible for the lens plate to be matched to the shape of the motor vehicle body. For the purpose of computation, the lens plate is now subdivided both in the horizontal and in the vertical direction into a specific number of elements 14, so that the length L of each element in the horizontal direction and the height H in the vertical direction, respectively, are given. The refractive index n of the material used for the lens plate is likewise presumed to be known. The calculation is now carried out in a multiplicity of horizontal and vertical sections through the light distribution, there arising in each section a curve for the light distribution plotted via the horizontal exit angle ωA of the light beams and via the vertical exit angle γA of the light beams, respectively. The calculation of the elements is carried out for each section in such a way that the required entry angle ωE and γE, respectively, of the light beams 22 into the element, that is to say the angle between the perpendicular on the straight-line segment and the light beams, is calculated for the required exit angle ωA and γA, respectively, of the light beams 22. The straight-line segment is the tangent to the envelope of the inner surf ace of the element in the entry region of the light beams for the respective step in the calculation. In this case, the entry angle is held constant in each case for one straight-line segment. The calculation is begun with the exit angle ωA and γA, respectively, from the right or below in the respective light distribution curve, and the exit angle relative to the next step in the calculation is altered in each case by a specific value. In this process, a horizontal section laid at a specific angle γA through the light distribution is associated with a horizontal section laid through the respective element at a distance from the upper edge of the element which is given by the distance of the angle γA from the lower edge of the light distribution. A corresponding result holds for vertical sections through the light distribution and the element. The following equations can be used to calculate the entry angles ωE and γE, respectively:

$$\omega_E(\omega_A) = \arctan\left\{\frac{\sin\left[\alpha - \arcsin\left(\frac{\alpha - \omega_A}{n}\right)\right]}{-\frac{1}{n} + \cos\left[\alpha - \arcsin\left(\frac{\alpha - \omega_A}{n}\right)\right]}\right\} \quad (1a)$$

$$\gamma_E(\gamma_A) = \arctan\left\{\frac{\sin\left[\beta - \arcsin\left(\frac{\beta - \gamma_A}{n}\right)\right]}{-\frac{1}{n} + \cos\left[\beta - \arcsin\left(\frac{\beta - \gamma_A}{n}\right)\right]}\right\} \quad (1b)$$

The notation here is:
$\omega E$ = horizontal entry angle
$\gamma E$ = vertical entry angle
$\alpha$ = swivel angle of the lens plate
$\beta$ = angle of inclination of lens plate
$n$ = refractive index of the material of the lens plate Since in the present example the reflector 10 is formed by a paraboloid of revolution, the light beams 22 are reflected therefrom parallel to the optical axis 18 of the lamp. The entry angle calculated using equations (1_a_) and (1_b_) is thus at the same time the swivel angle and angle of inclination, respectively, of the straight-line segment 23 of the element on the inner surface, pointing towards the reflector, with respect to the transverse axis and vertical axis, respectively.

In the case of a curved light plate, that is to say, a swivel angle or angle of inclination that is not constant, it is possible to use for equations (1_a_) and (1_b_) a mean swivel angle or angle of inclination αM and βM, respectively, which is present in the centre of the respective element. If, otherwise than as described above, the light beams are not reflected parallel to the optical axis from the reflector, when determining the swivel angle or angle of inclination of the element account is to be taken of the angle at which the light beams passing through the element extend relative to the optical axis.

The length A of the straight-line segment can be calculated from the prescription of the light distribution, that is to say how much light is to exit at the relevant angle ωA and γA, respectively. For this purpose, the respective light distribution curve arising in the horizontal or vertical section can be approximated by the so-called Gaussian bell-shaped curve, which represents the probability density of the normal distribution. The bell-shaped curve returns the following values for the light intensity I as a function of exit angle ωA and γA, respectively, and the maximum light intensity Imax in the centre of the light distribution curve:

$$I(\omega_A) = I_{max} \cdot e^{-(Q \cdot \omega_A)^2} \quad (2a)$$

bzw.

$$I(\gamma_A) = I_{max} \cdot e^{-(R \cdot \gamma_A)^2} \quad (2b)$$

Here, the parameters Q and R are correction quantities for matching the bell-shaped curve to the respective light distribution curve, by means of which the width of the bell-shaped curve can be varied. In this case, the maximum light intensity Imax arises for ωA=0° and γA=0°, respectively.

The length A (horizontal) or B (vertical) of the relevant straight-line segment can be calculated using the following equation:

$$A(\omega_A) = \frac{I(\omega_A) \cdot \cos\alpha}{\Sigma I(\omega_A) \cdot \cos \omega_E} \cdot L \quad (3a)$$

$$B(\gamma_A) = \frac{I(\gamma_A) \cdot \cos\beta}{\Sigma I(\gamma_A) \cdot \cos \gamma_E} \cdot H \quad (3b)$$

In the foregoing equations, $\Sigma I(\omega_A)$ and $\Sigma I(\gamma_A)$ respectively signify the sum of the light intensities at all points ωA and γA, respectively, used for the calculation of the light distribution curves. The ratio $$\frac{I(\omega_A \text{ bzw. } \gamma_A)}{\Sigma I(\omega_A \text{ bzw. } \gamma_A)}$$

determines how much light must reach the relevant points ωA and γA, respectively, of the light distribution curve.

Particularly with regard to producing the shape of the lens plate on a computer-controlled machine tool, it is advantageous to specify the latter in a rectangular coordinate system. For this purpose, a coordinate system is prescribed which has an axis X parallel to the optical axis of the lamp, an axis Y parallel to the transverse axis of the motor vehicle, and an axis Z parallel to the vertical axis of the motor vehicle, the origin of the coordinates being set, for example, in the left-hand upper corner of the lens plate. The coordinates X, Y, Z of the end point of the respective straight-line segment can then be calculated as follows:

(4*a*) $X(\omega_A) = \sin \omega_E \cdot A(\omega_A) + C$ (4*b*) $Y(\omega_A) = \cos \omega_E \cdot A(\omega_A) + D$ for the calculation in the horizontal section, and (4*c*) $X\gamma_A) = \sin \gamma_E \cdot B(\gamma_A) + E$ (4*d*) $Z(\gamma_A) = \cos \gamma_E \cdot B(\gamma_A) + F$ for the calculation in the vertical section. In equations (4*a*) to (4*b*), C, D, E and F signify the X, Y and Z coordinates, respectively, of the end point of the preceding straight-line segment. The value zero can be substituted for C, D, E and F in order to calculate the first straight-line segment, since the calculation is carried out starting from the origin of the coordinate system.

If the lens plate is either only inclined, that is to say the swivel angle α is zero, or only swivelled, that is to say the angle of inclination β is zero, the calculation can be carried out as described using the equations specified above, by setting the corresponding angle to zero in the equations.

Figure 10:
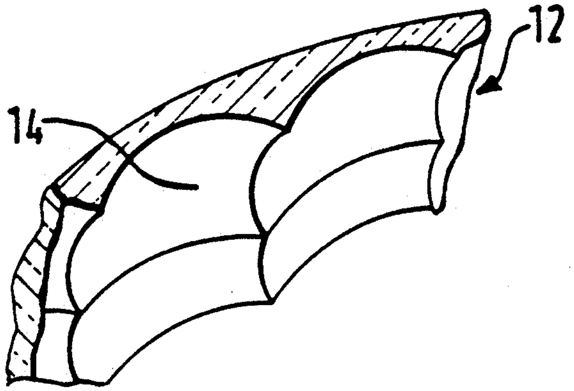

Otherwise than in the descriptions above, each element 14 can, as represented in FIG. 10, also be constructed as a concave lens formed on the inside of the lens plate and having a curvature pointing away from the reflector. In this case, the left-hand edge of each element deflects the light beams into the left-hand edge region of the light distribution, the light beams passing through the central region of each element are deflected into the central region of the light distribution, and the light beams passing through the right-hand edge of each element are deflected into the right-hand edge region of the light distribution. Correspondingly, the light beams passing through the upper edge of each element are deflected into the upper edge region of the light distribution, and the light beams passing through the lower edge are deflected into the lower edge region of the light distribution.

It will be understood that each of the elements described above, or two or more together, may also find a useful application in other types of constructions differing from the types described above.

While the invention has been illustrated and described as embodied in a vehicle lamp, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt if for various applications without omitting features that, from the standpoint of prior art, fairly constitute essential characteristics of the generic or specific aspects of this invention.

What is claimed as new and desired to be protected by Letters Patent is set forth in the appended claims.

I claim:

1. A vehicle lamp comprising a reflector; a light source; and a lens plate having an inner surface facing said reflector and provided with a plurality of optical elements for deflecting light beams reflected from said reflector, each of said optical elements being constructed so that the light beams passing therethrough are deflected in each case in at least one direction selected from a horizontal direction and a vertical direction so as to produce a prescribed light distribution identical for all of said optical elements; and wherein each of said optical elements is subdivided into a plurality of subprisms having flat surfaces extending tangentially to an envelope of an inner surface of the optical element, each of said subprisms being assigned to a region of the light distribution and having a surface determined by an amount of light assigned to the region of the light distribution.

2. A vehicle lamp as defined in claim 1, wherein each of said optical elements is constructed such that the light beams passing therethrough are deflected in each case in said horizontal direction and in said vertical direction such that the light beams produce said prescribed light distribution.

3. A vehicle lamp as defined in claim 1, wherein said envelope of each of said optical elements has a convex shape, so that with reference to a horizontal direction a left-hand edge region in a light exit direction of the optical element deflects the light beams into a right-hand edge region of the light distribution, a central region of the optical element deflects the light beams into a central region of the light distribution, and a right-hand edge region of the optical element deflects the light beams into a left-hand edge region of the light distribution, in a vertical direction an upper edge region of the optical element deflects the light beams into a lower edge region of the light distribution, the central region of the optical element deflects the light beams into the central region of the light distribution, and a lower edge region of an element deflects the light beams into the upper edge region of the light distribution.

4. A vehicle lamp as defined in claim 1, wherein said lens plate is inclined with respect to said vertical direction.

5. A vehicle lamp as defined in claim 1, wherein said lens plate is swivelled with respect to said horizontal direction.

6. A vehicle lamp as defined in claim 1, wherein said lens plate is inclined with respect to said vertical direction and swivelled with respect to said horizontal direction.

7. A vehicle lamp comprising a reflector; a light source; and a lens plate having an inner surface facing said reflector and provided with a plurality of optical elements for deflecting light beams reflected from said reflector, each of said optical elements being constructed so that the light beams passing therethrough are deflected in each case in at least one direction selected from a horizontal direction and a vertical directions so as to produce a prescribed light distribution identical for all of said optical elements; and wherein each of said optical elements is formed as a concave lens, so that with reference to said horizontal direction a left-hand edge region in a light exit direction of each optical element deflects the light beams into a left-hand region of the light distribution, a central region of the optical element deflects the light beams into a central region of the light distribution, and a right-hand edge region of the optical element deflects the light beams into the right-hand edge region of the light distribution, and in said vertical direction an upper edge region of the optical element deflects the light beams into an upper edge region of the light distribution, the central region of the optical element deflects the light beams into the central region of the light distribution, and a lower edge region of the optical element deflects the light beams into a lower edge region of the light distribution.

* * * * *